US012651487B2

(12) United States Patent
Paul

(10) Patent No.: US 12,651,487 B2
(45) Date of Patent: Jun. 9, 2026

(54) METHODS AND SYSTEM FOR GENERATING LOAD GENERATION DATA FOR NVH ASSESSMENT

(71) Applicant: FCA US LLC, Auburn Hills, MI (US)

(72) Inventor: Abhishek Paul, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 103 days.

(21) Appl. No.: 18/884,359

(22) Filed: Sep. 13, 2024

(65) Prior Publication Data

US 2026/0080720 A1     Mar. 19, 2026

(51) Int. Cl.
*B60W 50/16*          (2020.01)
*G07C 5/00*           (2006.01)
*G07C 5/08*           (2006.01)

(52) U.S. Cl.
CPC ............. *G07C 5/008* (2013.01); *B60W 50/16* (2013.01); *G07C 5/085* (2013.01)

(58) Field of Classification Search
CPC ........ B60W 50/16; G07C 5/008; G07C 5/085
See application file for complete search history.

(56)                References Cited

U.S. PATENT DOCUMENTS

2003/0088346 A1*   5/2003   Calkins .................. G01H 1/003
                                                      73/78
2004/0243351 A1*  12/2004   Calkins .................. G01M 1/22
                                                      73/462

FOREIGN PATENT DOCUMENTS

CN        117309133 A  * 12/2023   ............. G01H 17/00

OTHER PUBLICATIONS

Machine Translation of Gao's reference (CN-117309133-A) (Year: 2023).*

* cited by examiner

*Primary Examiner* — Tarek Elarabi
(74) *Attorney, Agent, or Firm* — Jeremy J. Klobucar

(57)                ABSTRACT

A method of performing NVH testing of a vehicle includes collecting raw road sensor data of first vehicle, converting the raw road data to frequency domain data; determining real components and imaginary components of the frequency domain data, generating load selection deck data form the real components and imaginary components, formatting the load selection deck data, generating formatted frequency domain data, communicating the frequency domain data to a testing device through a network and operating the testing device to excite a second vehicle using the formatted frequency domain data.

20 Claims, 6 Drawing Sheets

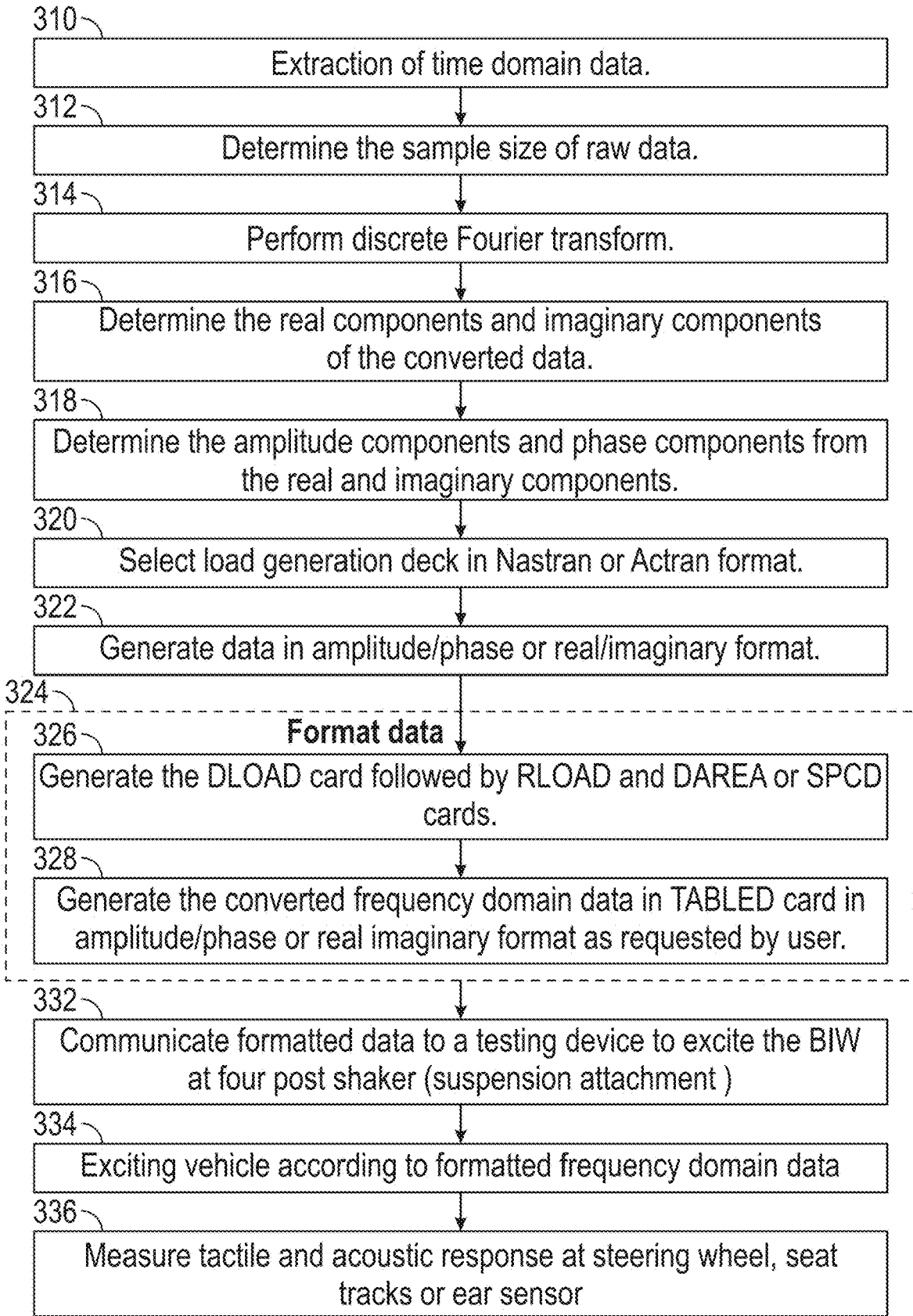

310 — Extraction of time domain data.

312 — Determine the sample size of raw data.

314 — Perform discrete Fourier transform.

316 — Determine the real components and imaginary components of the converted data.

318 — Determine the amplitude components and phase components from the real and imaginary components.

320 — Select load generation deck in Nastran or Actran format.

322 — Generate data in amplitude/phase or real/imaginary format.

324 — Format data

326 — Generate the DLOAD card followed by RLOAD and DAREA or SPCD cards.

328 — Generate the converted frequency domain data in TABLED card in amplitude/phase or real imaginary format as requested by user.

332 — Communicate formatted data to a testing device to excite the BIW at four post shaker (suspension attachment )

334 — Exciting vehicle according to formatted frequency domain data

336 — Measure tactile and acoustic response at steering wheel, seat tracks or ear sensor

FIG. 3

Nastran Format

```
$
$   Data generated by nCode script from ru_spectra_data_ncode
    _format_v1
$
$ ------------------ DLOAD CARDS ------------------
$
DLOAD, 100,1.0,1.0,2001,1.0 ,2002,1.0,2003,+
+,1.0,2004,1.0,2005,1.0,2006,1.0,2007,+
+,1.0,2008,1.0,2009,1.0,2010,1.0,2011,+
+,1.0,2012,1.0,2013,1.0,2014,1.0,2015,+
+,1.0,2016,1.0,2017,1.0,2018,1.0,2019,+
+,1.0,2020,1.0,2021,1.0,2022,1.0,2023,+
+,1.0,2024,1.0,2025,1.0,2026,1.0,2027,+
+,1.0,2028,1.0,2029,1.0,2030,1.0,2031,+
+,1.0,2032,1.0,2033,1.0,2034,1.0,2035,+
+,1.0,2036,1.0,2037,1.0,2038,1.0,2039,+
+,1.0,2040,1.0,2041,1.0,2042,1.0,2043,+
+,1.0,2044,1.0,2045,1.0,2046,1.0,2047,+
+,1.0,2048
$
$ ------------------ RLOAD2/SPCD CARDS ------------------
$
$ RLOAD2/SPCD CARD FOR GRID ID: 1001 (Knuckle:FL:BTM:+X)
RLOAD2,2001,3001,,,4001,5001,ACC
SPCD,3001,1001,1,1.0
$
$ RLOAD2/SPCD CARD FOR GRID ID: 1001 (Knuckle:FL:BTM:+Y)
RLOAD2,2002,3002,,,4002,5002,ACC
SPCD,3002,1001,2,1.0
$
$ RLOAD2/SPCD CARDS FOR GRID ID: 1001 (Knuckle:FL:BTM:+Z)
RLOAD2,2003,3003,,,4003,5003,ACC
SPCD,3003,1001,3,1.0
...
```

```
$
$
$ ------------------FORCE MAGNITUDE AND FORCE PHASE TABLES------------------
$
$
$ FORCE MAGNITUDE TABLE FOR GRID ID : 940112 (Magnitude:Torque )
TABLED1      4001LINEAR   LINEAR
+      0.0005.290e-41.0000013126.342.00000979.01853.0000005590.452
+      4.0000002567.7705.0000005338.1056.0000003208.5537.00000011891.192
+      8.0000016743.6219.0000019695.0110.000005751.17411.000004450.078
+      12.000003652.93013.000006227.56014.000006496.98215.000005096.721
+      16.000005938.87317.000008735.60718.000010887.4619.000009747.087
+      20.000009680.52821.000012460.9222.000013100.0823.00000010629.07
...
$ FORCE PHASE TABLE FOR GRID ID : 940112 (Phase:Torque)
TABLED1      5001LINEAR   LINEAR
+      0.000180.00011.000000-83.25622.000000142.68023.0000004.249109
+      4.000000-45.01145.000000-53.12546.000000-139.7407.000000179.55579
+      8.000000-45.01145.000000-62.12546.000000-111.33611.0000-172.770
+      12.0000053.7620113.00000-35.012514.00000-105.43715.00000156.7511
+      16.0000056.2659817.00000-23.589818.00000-118.83519.00000120.9175
+      20.000006.90461121.00000-97.253222.00000143.042823.0000013.17029
...
```

FIG. 4A

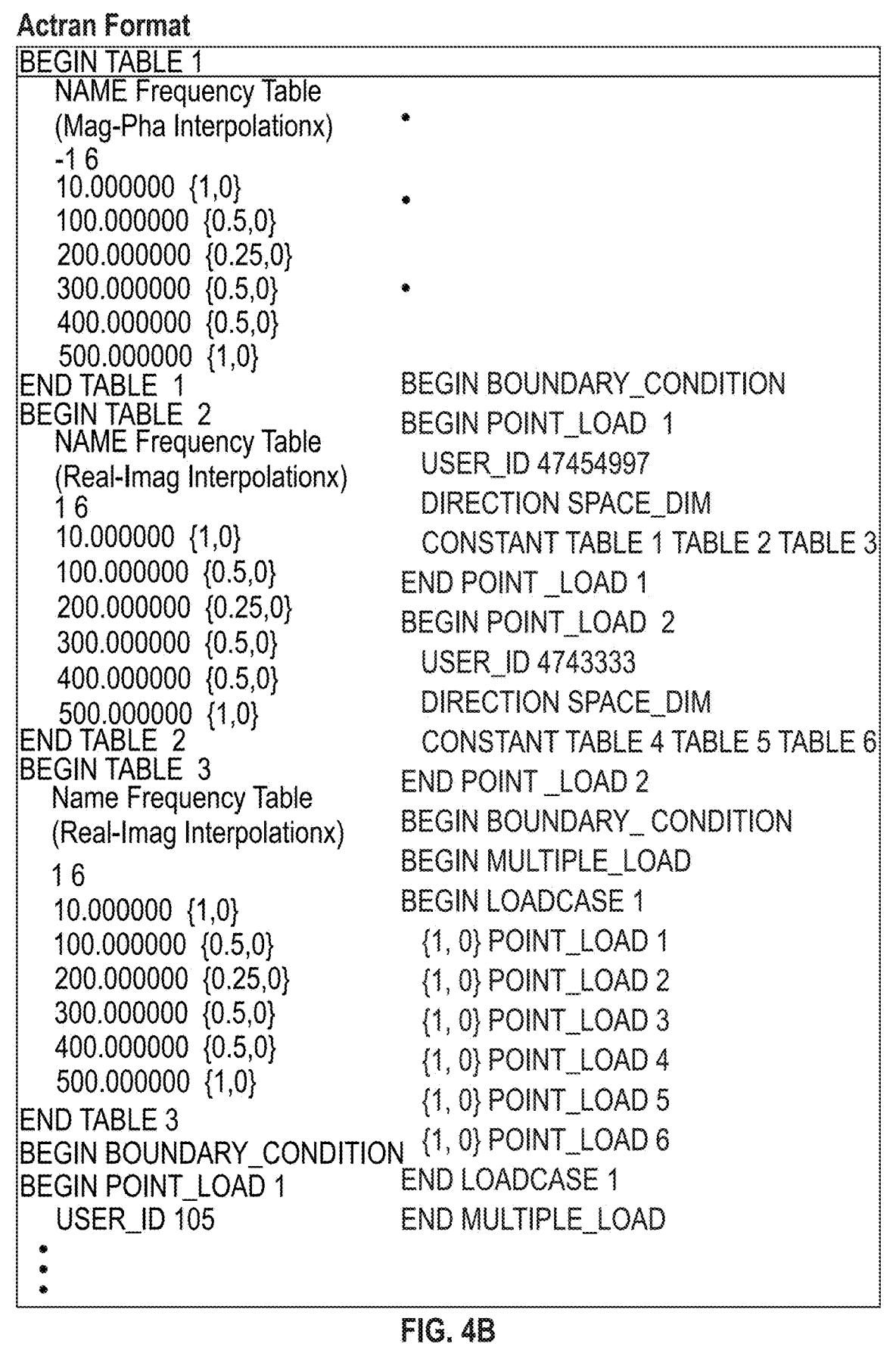

Actran Format

```
BEGIN TABLE 1
    NAME Frequency Table
    (Mag-Pha Interpolationx)          •
    -1 6
    10.000000  {1,0}
    100.000000  {0.5,0}               •
    200.000000  {0.25,0}
    300.000000  {0.5,0}
    400.000000  {0.5,0}               •
    500.000000  {1,0}
END TABLE  1                          BEGIN BOUNDARY_CONDITION
BEGIN TABLE  2                        BEGIN POINT_LOAD  1
    NAME Frequency Table
    (Real-Imag Interpolationx)            USER_ID 47454997
    1 6                                   DIRECTION SPACE_DIM
    10.000000  {1,0}                      CONSTANT TABLE 1 TABLE 2 TABLE 3
    100.000000  {0.5,0}               END POINT _LOAD 1
    200.000000  {0.25,0}              BEGIN POINT_LOAD  2
    300.000000  {0.5,0}                   USER_ID 4743333
    400.000000  {0.5,0}                   DIRECTION SPACE_DIM
    500.000000  {1,0}                     CONSTANT TABLE 4 TABLE 5 TABLE 6
END TABLE  2                          END POINT _LOAD 2
BEGIN TABLE  3                        BEGIN BOUNDARY_ CONDITION
    Name Frequency Table             BEGIN MULTIPLE_LOAD
    (Real-Imag Interpolationx)
    1 6                              BEGIN LOADCASE 1
    10.000000  {1,0}                    {1, 0} POINT_LOAD 1
    100.000000  {0.5,0}                 {1, 0} POINT_LOAD 2
    200.000000  {0.25,0}                {1, 0} POINT_LOAD 3
    300.000000  {0.5,0}                 {1, 0} POINT_LOAD 4
    400.000000  {0.5,0}                 {1, 0} POINT_LOAD 5
    500.000000  {1,0}                   {1, 0} POINT_LOAD 6
END TABLE 3
BEGIN BOUNDARY_CONDITION             END LOADCASE 1
BEGIN POINT_LOAD 1                    END MULTIPLE_LOAD
    USER_ID 105
    •
    •
    •
```

FIG. 4B

METHODS AND SYSTEM FOR GENERATING LOAD GENERATION DATA FOR NVH ASSESSMENT

FIELD

The present disclosure relates to performing Noise, vibration and harshness (NVH) assessments for a vehicle and more specifically to a method and system for automated data generation form a physical time signal data.

BACKGROUND

This section provides background information related to the present disclosure which is not necessarily prior art.

Noise, vibration and harshness (NVH) tests are performed with data that is used to drive a test machine for providing a desired input response. Based on the input response, the reaction to different parts of the vehicle to the data may be observed. By observing the data, the amount of NVH present is determined. The determination sets forth an acceptable or unacceptable range.

Low- to mid-frequency NVH simulations require the use of data NASTRAN format with manual editing to define tables for load amplitudes and phase. NVH simulations also required manual definition of other cards of data which is time consuming.

SUMMARY

This section provides a general summary of the disclosure, and is not a comprehensive disclosure of its full scope or all of its features.

The present disclosure provides an automated system for processing samples and ultimately controlling a testing device to determine a vehicle response.

In one aspect of the disclosure, a method of performing NVH testing of a vehicle includes collecting raw road sensor data of first vehicle, converting the raw road data to frequency domain data, determining real components and imaginary components of the frequency domain data, generating load selection deck data form the real components and imaginary components, formatting the load selection deck data, generating formatted frequency domain data, communicating the frequency domain data to a testing device through a network and operating the testing device to excite a second vehicle using the formatted frequency domain data In another aspect of the disclosure, a system for testing NVH of a vehicle includes a testing device and a data processing system receiving raw road sensor data of first vehicle. The data processing system programmed to convert the raw data to frequency domain data, determine real components and imaginary components of the frequency domain data, generate load selection deck data form the real components and imaginary components, format the load selection deck data, generate formatted frequency domain data and communicate the frequency domain data to the testing device through a network. The testing device excites a second vehicle using the formatted frequency domain data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a flow chart of a method for operating the system.

FIG. 4A is an example of formatted data in a Nastran format.

FIG. 4B is an example of the data in an Astran format.

Corresponding reference numerals indicate corresponding parts throughout the several views of the drawings.

DETAILED DESCRIPTION

Example embodiments will now be described more fully with reference to the accompanying drawings.

Figure 1:
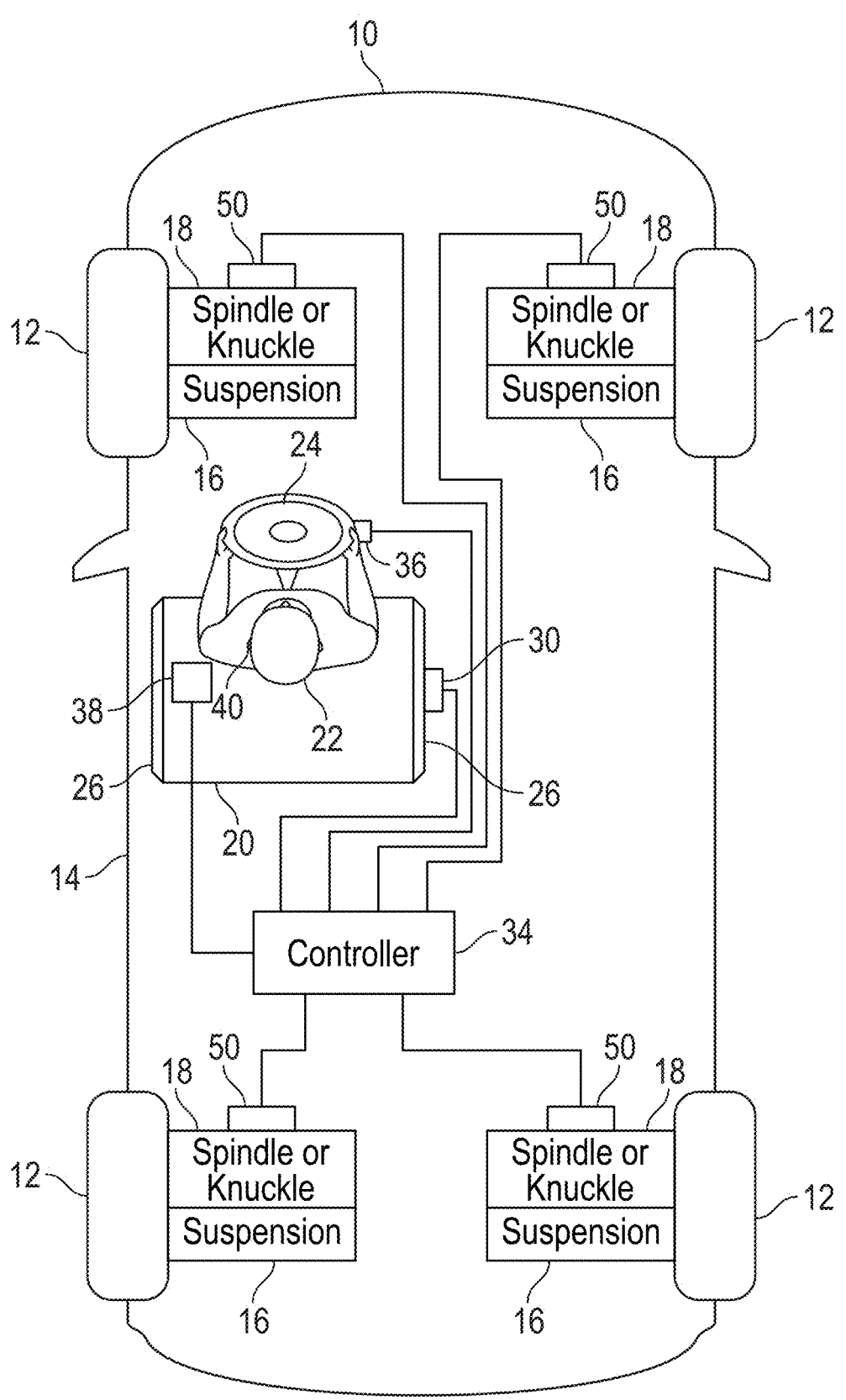
FIG. 1 is a block diagrammatic view of a vehicle having sensors used for the present disclosure.

Referring now to FIG. 1, a vehicle 10 is illustrated having a plurality of wheel/tire assemblies 12. The wheel/tire assemblies 12 are coupled to a body 14 of the vehicle through a suspension 16. The suspension 16 may have a spindle or knuckle 18 coupled thereto. The vehicle 10 also includes a driver seat 20. The driver seat 20 may ultimately have a driver 22 disposed therein. The driver seat 20 has a steering wheel 24 that is used for directing front wheel/tire assemblies 12 into the desired direction. The steering wheel 12 may also be coupled to the rear wheels in a rear wheel steering type vehicle. The vehicle 10 may be used for collecting raw road data corresponding to the vehicle. In addition, the vehicle may be used for audible or tactile testing with formatted road data or a testing device such as a simulator such as a four post shaker as described below. The vehicle 10 may therefore represent a first vehicle and a second vehicle even though the vehicles processed may be the same or different.

The driver seat has a seat track 26 on which the seat 20 is able to move. The seat track 20 may have a sensor 30 such as an accelerometer that generates signals that are communicated to a controller 34. The signal from the sensor 30 may correspond to a tactile response of the vehicle operator. Another sensor 36 may be disposed on the steering wheel 24. As illustrated, the sensor 36 is illustrated on the hand grip portion of the steering wheel. However, the sensor 36 may also be coupled to the steering wheel shaft. The sensor 36 may be an accelerometer used to communicate signals to the controller 34 corresponding to acceleration or vibration signals at the steering wheel 24. The signals from the sensor 36 correspond to tactile response signals of what the driver feels through the steering wheel.

The controller 34 may also be coupled to a sensor 38 disposed adjacent to a driver's ear position. That is, the driver may have an ear 40 and the sensor 38 may be coupled proximate to or within the area of the ear 40 when acoustic road noise emission testing is taking place.

The spindles or knuckles 18 may each have a sensor 50 coupled thereto. The sensor 50 may also be accelerometers that are used to generate acceleration signals corresponding to the movement of the spindle or knuckle 18 which corresponds to a road profile.

The sensors 50 and the signals associated therewith may be used to collect raw road sensor data to ultimately control a testing device such as four-poster road simulator. As will be described in greater detail below, the sensors 50 may generate signals corresponding to the surface contours of the road. Multiple road surface contours may be used in testing.

The vehicle response may be determined by the sensors 30, 36, 38. That is, the tactical feel or vibration sensed by the user may be determined based upon the seat track sensor 30 and the steering wheel sensor 36. The acoustic response of the vehicle 10 may be determined by the sensor 38.

Figure 2A:
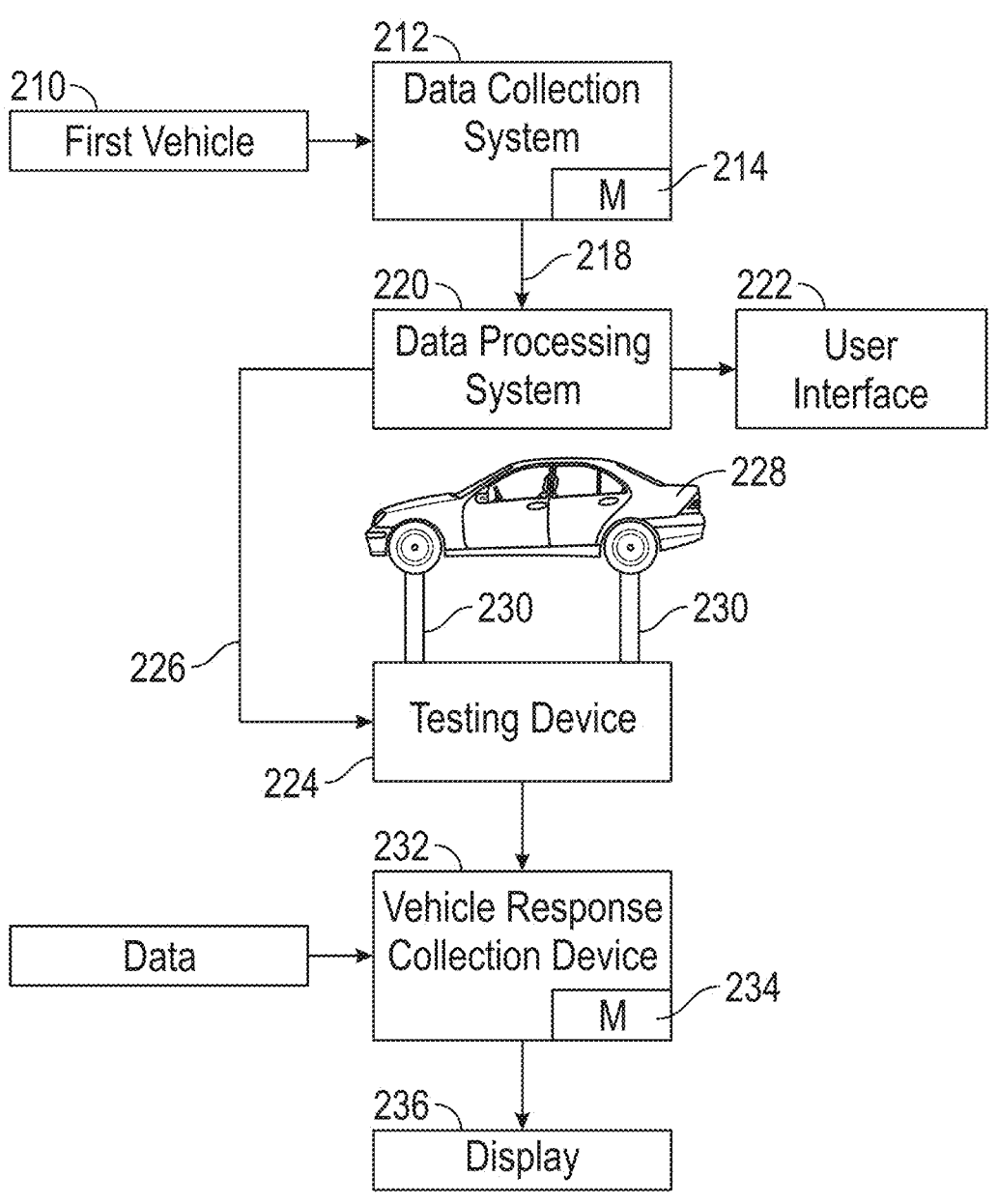
FIG. 2A is a high level block diagrammatic view of the data acquisition and testing phases of the present disclosure.

Referring now to FIG. 2A, a first vehicle 210 may have various sensors such as the sensors 50 coupled to the suspension 16 or the spindle or knuckle 18. The first vehicle 210 may be coupled to a data collection system 212. The data collection system 212 may be that illustrated as the controller 34 in FIG. 1. The data collection system 212 may be disposed on the vehicle and data may be stored in the memory 214. Data from the sensors may be captured at various times and on various road surfaces to provide a varying data response. Ultimately, the data collection system 212 communicates data through a network 218 to a data processing system 220. The data processing system 220 may extract time delay data by taking samples of the raw data as will be described in greater detail below. The data processing system 220 may also perform other processing tasks. Ultimately, formatting data is communicated to a testing device 224 through a network 226. The testing device 224, in this example, may be four post shaking machine coupled to a second vehicle 228. The posts 230 (two of four are shown) of the testing device 224 are used to excite the vehicle according to the formatted frequency domain data. A vehicle response data collection device 232 has a memory 234 that receives the data from the vehicle 228. The vehicle data may include the sensor data from the sensors 30, 36 and 38. Ultimately, the tactical and/or acoustic performance of the vehicle may be displayed on a display 236.

Figure 2B:
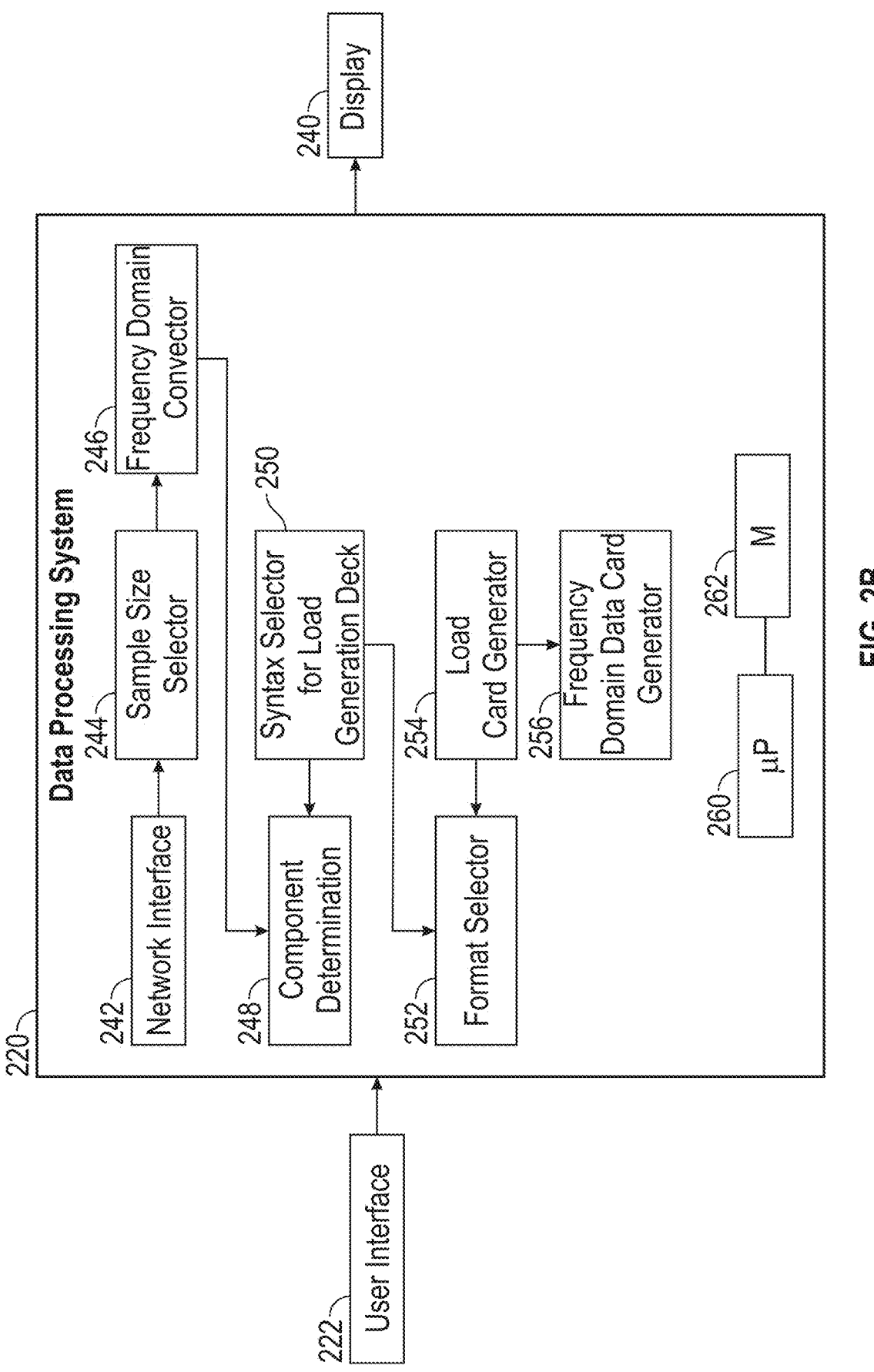
FIG. 2B is a high level block diagrammatic view of the data processing system of FIG. 2A.

Referring now also to FIG. 2B, the data processing system 220 has a user interface 222. The user interface 222 may be a keyboard, a mouse, touchscreen display or other data entry device. The user interface 222 may be for forming selections for various aspects of the method as described below. The data processing system 220 is also coupled to a display 240. The display 240 may generate various prompts, display data or various other information. The data processing system has a network interface 242 that is used for communicating through networks 218 and 226. The network interface 242 receives raw data from the data collection system 212. A sample size selector 244 is used to obtain a sample of a certain size. As will be described in greater detail below, the sample size selector may have a frequency for selecting data points from the raw data. Also, the sample size selector may filter data outside of a tested window. The samples from the sample size selector are provided to a frequency domain converter 246. The frequency domain converter 246 converts the sample data into frequency domain and to thus frequency domain. As will be described in greater detail, the frequency domain converter may be a Fourier transform. Block 248 is a component determination block. The component determination block allows the frequency domain signals to be converted to real and imaginary components. The real and imaginary components may also be converted to amplitude components and phase components. The real components and imaginary components and/or the amplitude components and phase components are communicated to a syntax selector 250 that selects the syntax for the load generation deck which is a formatted way to provide data to the testing device 224. The syntax selector 250 may therefore allow the user to generate a selection signal that corresponds to the type of system or the testing system that will receive the data. In the present example, Nastran and Astran are provided by way of example. However, other types of systems may be used. In block 252, the system may also provide a format selector so that the output may be generated in either amplitude/phase or real/imaginary formatting. A load card generator 254 receives the format selected and syntax selected data to generate load cards for providing to the testing device 224. A frequency domain data card generator generates the data cards. As will be described in greater detail below, a DLOAD card may be generated followed by a RLOAD and a DAREA or SPCD card. The cards may be communicated through the networking interface 242 to the testing device 224 through the network to control.

The data processing system 220 has a microprocessor 260 and a memory 262. The microprocessor may also be referred to as a processor. The processor executes various steps to perform the functions set forth in blocks 244-246. The memory 262 is a non-transitory computer-readable medium that includes machine-readable instructions that are executable by the processor 260. The instructions include the instructions for performing the functions set forth in blocks 244-256.

Referring now to FIG. 3, a method of generating data and ultimately forming a tactical or acoustic test is set forth. In step 310, time domain data is extracted from sensors within the vehicle. In FIG. 1, sensors 50 correspond to sensors that may be used to obtain physical vehicle signals that are generated in response to the contours or profile of the road. Of course, other types of sensors beside those located at the spindle or knuckle of the vehicle suspension 16 may be used. In step 312, a sample size of the raw data from step 312 may be obtained. The sample size may be shortened to eliminate pre- and post-testing signals. That is, the load data may be generated both going to and from a specific road that is used to excite the vehicle. The to-and-from data may be excluded from processing. Likewise, the sample size of the raw data may also be sampled at a predetermined frequency. The frequency depends on the frequency of the signals of the interest within the raw data. The sample size may therefore be greater than the frequency of interest of the data. In step 314, the time domain data is converted to frequency domain data. This may be done by performing a discrete Fourier transform (DST). Various types of discrete Fourier transforms may be used. The discrete Fourier transform may be a fast Fourier transform.

In step 316, the real components and imaginary components of the converted data from the frequency domain data are generated in step 314.

In step 318, the amplitude and phase components may also be generated from the real and imaginary components of 316. Step 318 is an optional step and may not be performed in certain situations. That is, some test devices may not require or need the amplitude and phase. Rather, the real and imaginary components of the frequency signal may be used for further processing.

In step 320, the syntax of two common machines may be selected. That is, a user input or user interface 222, as shown in FIG. 2, may be used to select the different syntaxes for the different systems. In the present example, Nastran or Astran formats may be used. Both systems require slightly different formats. In step 322, a selection signal may be used to select the amplitude phase component or the real or imaginary components that are to be used in processing. The amplitude/phase or real/imaginary formats may be selected to correspond to whether amplitude and phase or real and imaginary components were selected in step 318.

After step 322, the step 324 formats the data. The step of formatting the data in step 324 comprises the step of formatting the data into various "cards". The cards are groups of data that are used by the testing device 224 illustrated in FIG. 2. An example of the cards is provided below. In step 326, a Dload card followed by a Rload card and DArea card is obtained. The formatting data step 324 also includes step 328. In step 328, the converted frequency domain data may be formatted into a TABLE D card in amplitude/phase or real imaginary format as requested or selected by a user. Ultimately, the formatted data is communicated to a testing device to excite a body in white second vehicle at a four post shaker or other testing device. In a four post shaker, the suspension of the second vehicle 228 is coupled to a suspension attachment. In step 334, the vehicle may be excited using the formatted frequency data from steps 326 and 328. The vehicle performs a simulated road load operation to allow the vehicle to be excited. In step 336, the tactical and acoustic response may be determined. Of course, the tactical response may be generated from the steering wheels sensor 36 and the seat track sensor 30. The ear sensor 36 may generate an acoustic response.

Referring now to FIG. 4A, one example of a generated formatted data is set forth. In FIG. 4A, Nastran format data is generated. In FIG. 4B, Actran data is generated. In FIG. 4A, the DLOAD cards are set forth above RLOAD cards and SPCD cards. The data may include multiplication factors and phases. For example, "2048" in FIG. 4A corresponds to three different locations and three different directions of accelerators that are used. The Rload data is also provided. In the Actran format, a frequency data with magnitude and phase or real and imaginary numbers with interpolation is provided. Both the datasets in FIGS. 4A and 4B are generated in a format that is useful by the testing device.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
collecting raw road sensor data of a first vehicle;
converting the raw road data to frequency domain data;
determining real components and imaginary components of the frequency domain data;
generating load selection deck data form the real components and imaginary components;
formatting the load selection deck data;
generating formatted frequency domain data;
communicating the formatted frequency domain data to a testing device through a network; and
operating the testing device to excite a second vehicle using the formatted frequency domain data.

2. The method of claim 1 wherein collecting the raw road data comprises collecting raw road data from a plurality of accelerometers.

3. The method of claim 1 wherein collecting the raw road data comprises collecting the raw road data from an accelerometer disposed on a suspension component of the first vehicle.

4. The method of claim 1 further comprising sampling the raw road data of a plurality of road surfaces.

5. The method of claim 1 wherein determining the real components and imaginary components comprises determining amplitude components and phase components.

6. The method of claim 1 further comprising determining a tactile response of the second vehicle.

7. The method of claim 6 wherein determining the tactile response comprises determining the tactile response of the second vehicle from a first accelerometer disposed within the second vehicle.

8. The method of claim 7 wherein determining the tactile response comprises determining the tactile response of the second vehicle from the first accelerometer coupled to a seat track.

9. The method of claim 8 wherein determining the tactile response comprises determining the tactile response of the second vehicle from a second accelerometer coupled to a steering wheel.

10. The method of claim 1 further comprising determining an acoustic response of the second vehicle.

11. The method of claim 10 wherein determining the acoustic response in response to an accelerometer disposed within the second vehicle.

12. The method of claim 10 wherein determining the acoustic response in response to an accelerometer disposed proximate an ear location of a vehicle operator within the second vehicle.

13. A system comprising:

a testing device;

a data processing system receiving raw road sensor data of a first vehicle, the data processing system programmed to convert the raw data to frequency domain data, determine real components and imaginary components of the frequency domain data;

generate load selection deck data form the real components and imaginary components;

format the load selection deck data;

generate formatted frequency domain data; and communicate the formatted frequency domain data to the testing device through a network; and the testing device exciting a second vehicle using the formatted frequency domain data.

14. The system of claim 13 wherein the testing device comprises a four post shaker coupled to the second vehicle.

15. The system of claim 13 further comprising a plurality of accelerometers coupled to the first vehicle generating the raw road data.

16. The system of claim 13 wherein the data processing system is programmed to determine amplitude components and phase components from the real components and imaginary components.

17. The system of claim 13 wherein a vehicle response data collection device determines a tactile response of the second vehicle.

18. The system of claim 17 further comprising a first accelerometer and a second accelerometer disposed within the second vehicle and coupled to the second vehicle response data collection device determines a tactile response of the second vehicle.

19. The system of claim 13 wherein a vehicle response data collection device determines an acoustic response of the second vehicle.

20. The system of claim 19 wherein a vehicle response data collection device determines the acoustic response in response to an accelerometer disposed within the second vehicle proximate an ear location of a vehicle operator.

* * * * *